(12) United States Patent
Liu (10) Patent No.: US 7,251,208 B2
(45) Date of Patent: Jul. 31, 2007

(54) OPTICAL PICK-UP SYSTEM FOR USE IN AN OPTICAL DISK DEVICE INCLUDING USE OF IMPROVED GRATINGS WITH MORE EFFICIENT BEAM DIFFRACTION

(75) Inventor: Xinbing Liu, Acton, MA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 583 days.

(21) Appl. No.: 10/858,415

(22) Filed: Jun. 1, 2004

(65) Prior Publication Data

US 2005/0265202 A1   Dec. 1, 2005

(51) Int. Cl.
*G11B 7/00* (2006.01)
(52) U.S. Cl. .................. 369/112.03; 369/109.01; 369/44.12
(58) Field of Classification Search .............. None
See application file for complete search history.

(56) References Cited

U.S. PATENT DOCUMENTS

| | | | |
|---|---|---|---|
| 6,167,016 A * | 12/2000 | Block et al. | 369/44.15 |
| 6,360,012 B1 * | 3/2002 | Kreuzer | 382/211 |
| 6,496,465 B1 | 12/2002 | Broome et al. | |
| 6,549,504 B2 | 4/2003 | Liu et al. | |
| 2002/0118611 A1 | 8/2002 | Kim et al. | |
| 2003/0007436 A1 | 1/2003 | Komma et al. | |
| 2005/0053844 A1 * | 3/2005 | Wu | 430/5 |
| 2005/0135744 A1 * | 6/2005 | Greiner et al. | 385/37 |

\* cited by examiner

*Primary Examiner*—Muhammad Edun
(74) *Attorney, Agent, or Firm*—Harness, Dickey & Pierce, PLC (57) ABSTRACT

The present invention is an optical pick-up system for use in an optical disk device including more efficient beam diffraction for tracking purposes. The system may be used for one or more types of optical disks (e.g., DVDs, CDs, CD-ROMs). The invention includes a system for use in a DVD player; however, the present invention is applicable to any optical disk device. The system invention includes a gray-scale grating, which provides more efficient diffraction of tracking and processing portions of the laser(s) used in optical disk devices.

37 Claims, 8 Drawing Sheets

OPTICAL PICK-UP SYSTEM FOR USE IN AN OPTICAL DISK DEVICE INCLUDING USE OF IMPROVED GRATINGS WITH MORE EFFICIENT BEAM DIFFRACTION

FIELD OF THE INVENTION

The present invention relates to an optical pick-up used for recording/reproducing or erasing information on an optical disk, an optical disk apparatus, and an information-processing apparatus using the same.

BACKGROUND OF THE INVENTION

Optical memory technology that uses optical disks having a pit pattern as high-density, large-capacity information storage media has been used in an increasingly expanded range of applications from digital audio disks to video disks, document file disks, and further to data files, etc. In recent years, a high-density optical disk such as a DVD-ROM using a visible red laser of wavelength of 630 nm to 670 nm as a light source has become prevalent. Furthermore, an optical disk (DVD-RAM) capable of high-density recording has been commercialized. A large capacity of digital data has been able to be recorded on an optical disk easily. Furthermore, CD-R that is highly compatible with CD technology, which has been used broadly, has been prevalent. CDs (CD, CD-R, CD-RW) have a base material thickness of about 1.2 mm, and DVDs (DVD-ROM, DVD-RAM, or the like) have a base material thickness of about 0.6 mm. Throughout this document, the term optical disk is used generically to refer to optical storage disks such as DVDs and CDs.

Portable optical disk players (like DVD players and CD players) are becoming increasingly popular. Two of the important differentiating factors of these portable players are (1) small size and (2) lower power consumption. Small size contributes to lightweight portable devices that consumers want. Low power consumption allows for longer battery lifetimes of the devices. These longer battery lifetimes increase consumer satisfaction. A need exists for a way to make optical disk players that are smaller and use less power.

Current methods for reading optical disks include directing a laser upon the pits or bumps within the tracks of the optical disk. The majority of this beam (the "processing portion") is reflected off the optical disk and is incident upon photodetectors that then convert the photonic signal into an electric signal representing the bits stored on the optical disk. As the optical disk spins, it may wobble (especially in a portable player) and the processing portion of the beam may either go out of focus or off the track on the disk. A need exists for a way to ensure that the processing portion stays focused in the center of the track to ensure accurate reading of the disk.

In U.S. Patent Application No. 20030007436, entitled, "Optical pick-up, optical disk apparatus and information processing apparatus," this beam tracking is handled by diffracting a tracking portion of the laser with a binary grating, such that it is incident on the "land" of the optical disk between tracks. This tracking portion of the beam is reflected at a different angle and is measured with a separate photodetector than the processing portion. A problem remains that a third portion of the beam is lost due to inefficiencies in the binary grating. In one example, 75% of the beam is used for reading the disk, 9% of the beam is used for tracking, and 16% of beam energy is lost due to unused diffraction orders. If the lost energy could be utilized for either reading or tracking, a less powerful laser could be used within optical disk devices (like DVD/CD readers and writers), which would lower the costs of producing and operating these devices. Therefore, a need exists for a way to decrease the inefficiencies in diffracting a portion of the laser beam used in optical disk devices.

It is an object of this invention to make optical disk drives that are smaller and use less power.

It is another object of this invention to ensure that the processing portion stays focused in the center of the track to ensure accurate reading of the disk.

It is yet another object of the present invention to increase the efficiency of the optical path of the laser beams used in optical disk devices.

It is yet another object of the present invention to decrease the inefficiencies in diffracting a portion of the laser beam used in optical disk devices.

SUMMARY OF THE INVENTION

The present invention is an optical pick-up system for use in an optical disk device including more efficient beam diffraction for tracking purposes. The system may be used for one or more types of optical disks (e.g., DVDs, CDs, CD-ROMs). The invention includes a system for use in a DVD player; however, the present invention is applicable to any optical disk device. The system invention includes a gray-scale grating, which provides more efficient diffraction of tracking and processing portions of the laser(s) used in optical disk devices.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

The present invention is an optical pick-up system for use in an optical disk device including more efficient beam diffraction for tracking purposes. The system may be used for one or more types of optical disks (e.g., DVDs, CDs, CD-ROMs). The invention includes a system to be used in a DVD player (that, according to current standards, reads both CD and DVD formats); however, the present invention is applicable to any optical disk device (such as a CD writer, DVD player, DVD writer, future generation optical disk device, etc.).

Figure 1A:
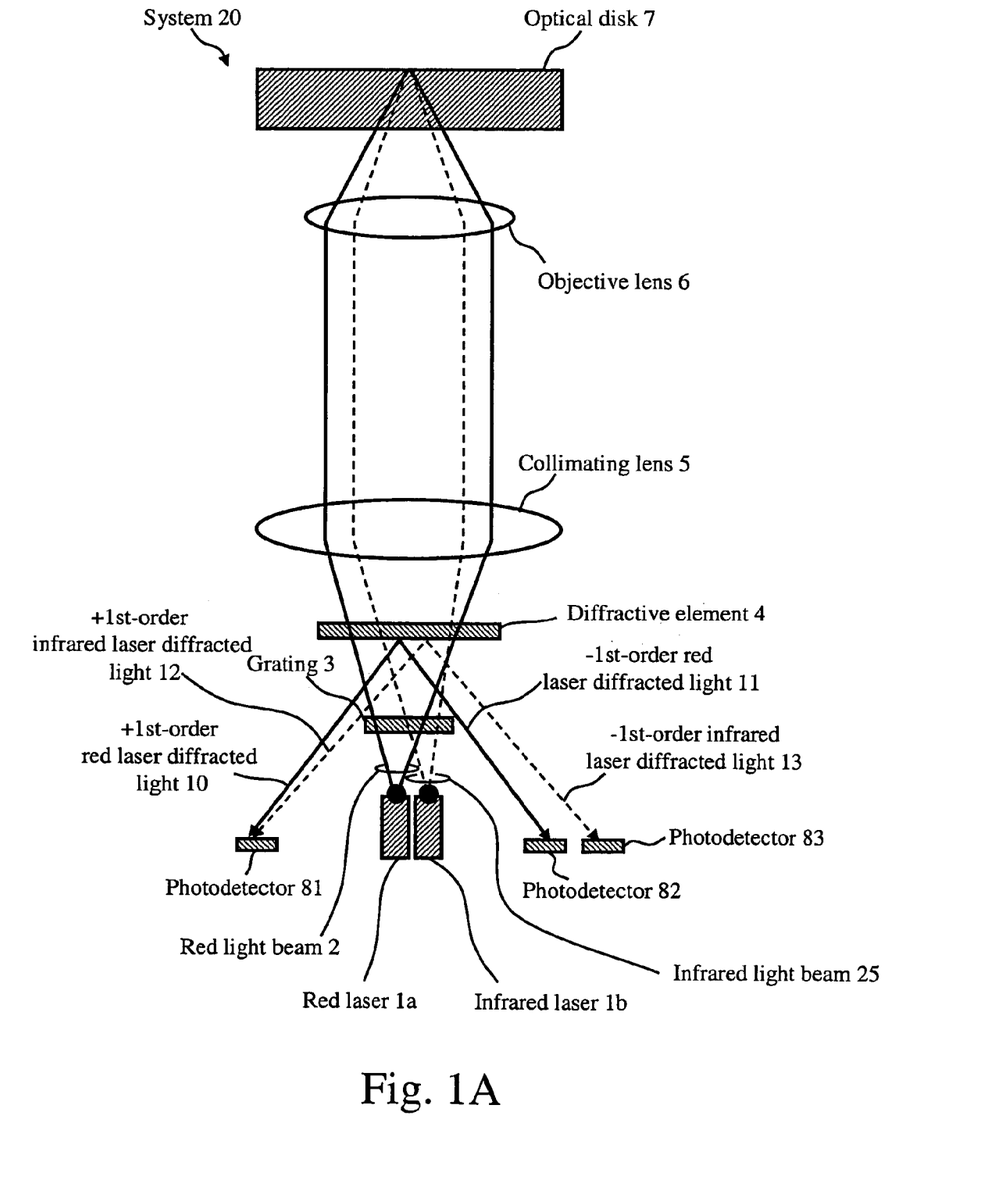
FIG. 1A is a front view of an optical pick-up system for use in optical disk devices.

FIG. 1A shows a top view of an optical pick-up system 20 including the elements of: a red laser 1a, an infrared laser 1b, a red light beam 2, a grating 3, a diffractive element 4, a collimating lens 5, an objective lens 6, an optical disk 7, a +1st-order red laser diffracted light 10, a −1st-order red laser diffracted light 11, a +1st-order infrared laser diffracted light 12, a −1st-order infrared laser diffracted light 13, an infrared light beam 25, a photodetector 81, a photodetector 82, and a photodetector 83.

Figure 1B:
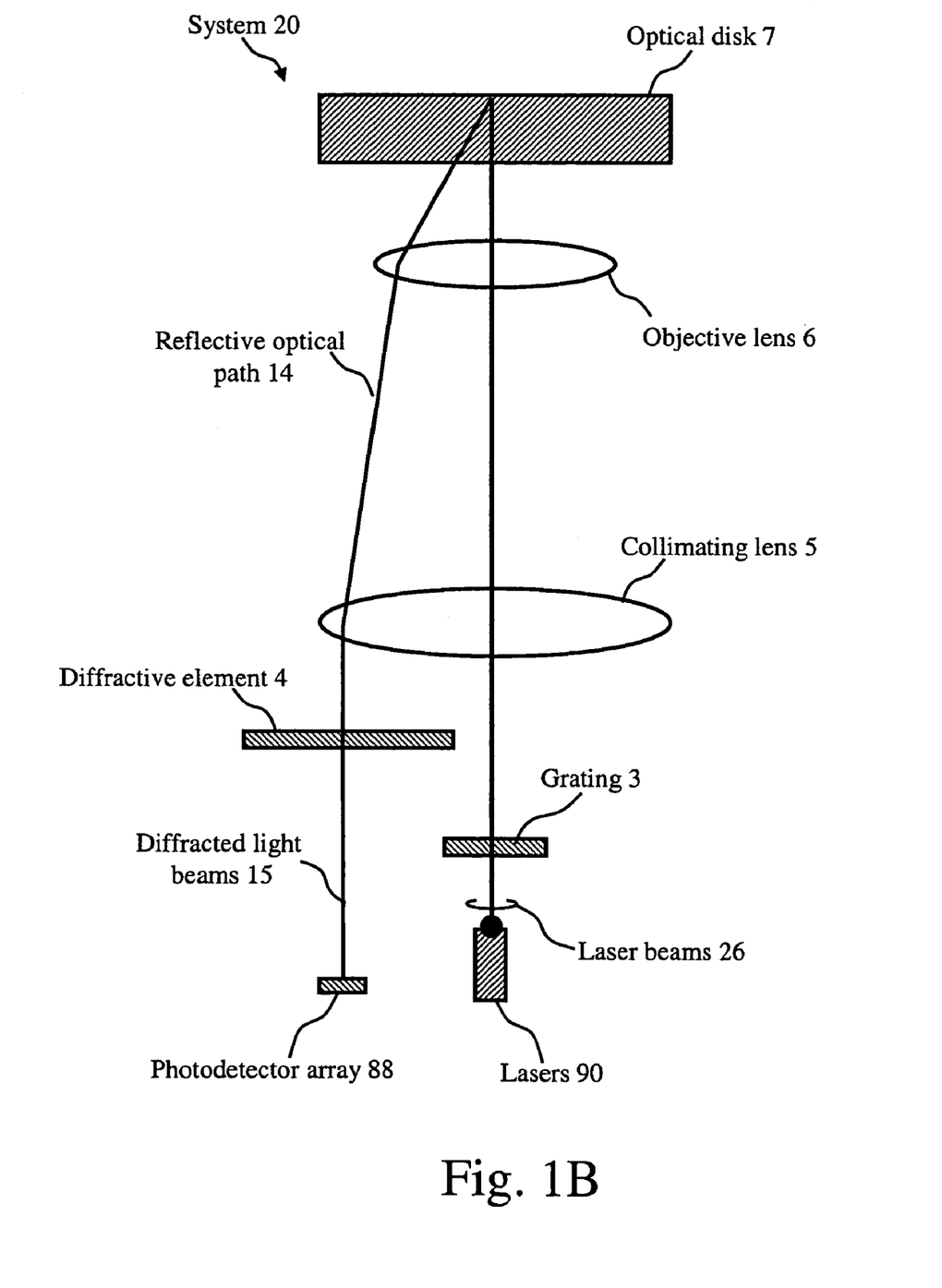
FIG. 1B is a side view of the same optical pick-up system for use in optical disk devices.

FIG. 1B shows a side view of system 20, including the elements of grating 3, diffractive element 4, collimating lens 5, objective lens 6, optical disk 7, a reflective optical path 14, a plurality of diffracted light beams 15, a plurality of laser beams 26, a photodetector array 88, and an array of lasers 90.

Optical pick-up system 20 includes red laser 1a and infrared laser 1b. In one example, separate semiconductor laser chips, that is, red laser 1a and infrared laser 1b, are arranged in a form of hybrid. In this case, since each semiconductor laser chip can be made to be a minimum size and can be produced by respective optimum methods, it is possible to realize the properties of low noise, low consumption of electric power, and high durability. In another example, red laser 1a and infrared laser 1b may be formed into one semiconductor laser chip monolithically. In this case, it is possible to reduce the work hours necessary to assemble steps or to determine a distance between two light-emitting points exactly. These configurations can be applied for the following optical pick-ups and all the embodiments.

Red light beam 2 is emitted from red laser 1a. In one example, red light beam 2 has a wavelength in the range of 630 to 670 nm (appropriate for reading DVDs).

Infrared light beam 25 is emitted from infrared laser 1b. In one example, infrared light beam 25 has a wavelength in the range of 740 to 830 nm (appropriate for reading CDs).

Figure 4:
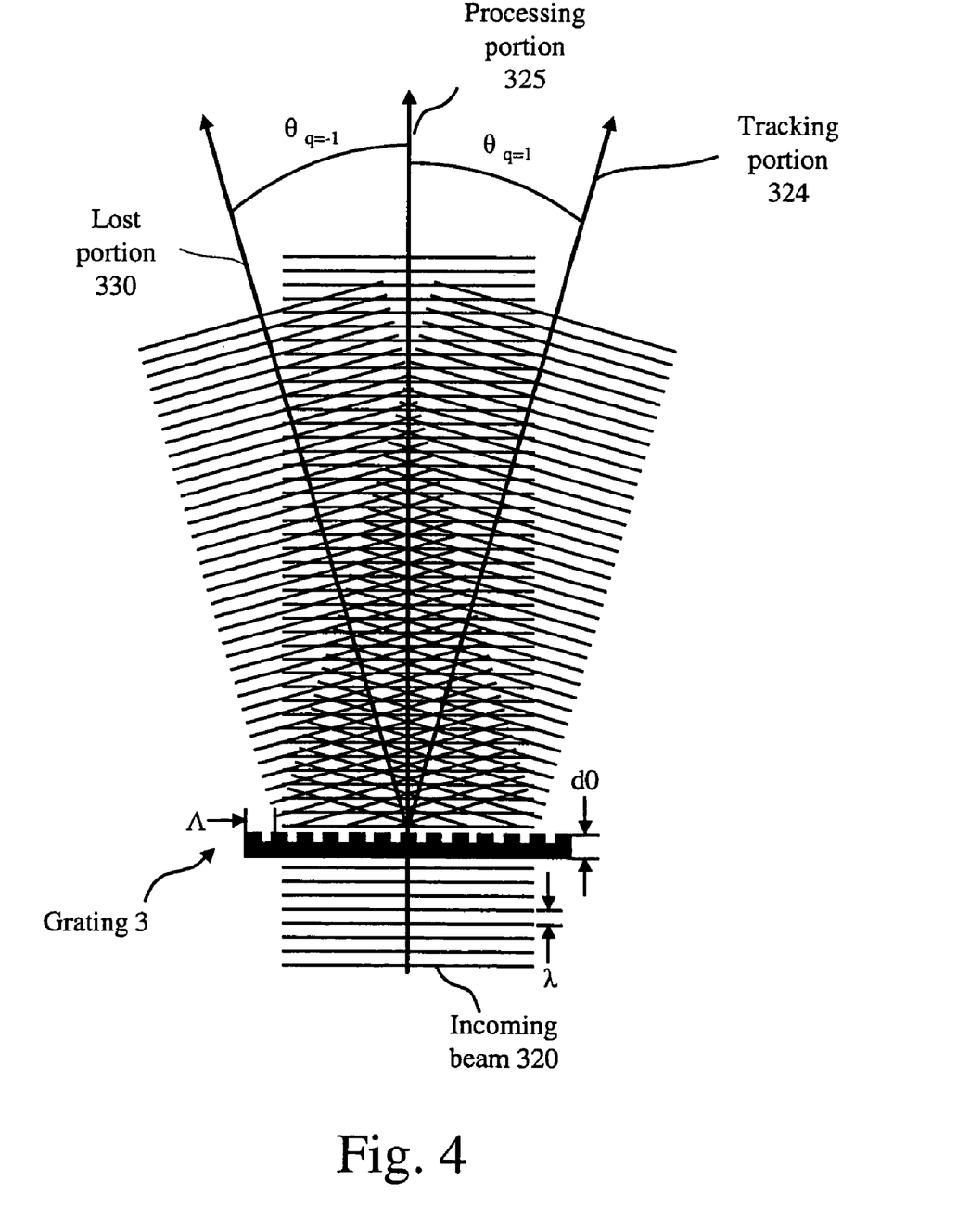
FIG. 4 is a magnified view of a grating.

Grating 3 is described in further detail in reference to FIG. 4.

Collimating lens 5 is a conventional collimating lens, such as those made by X-Ray Optical, that focuses the beam (e.g., red light beam 2 or infrared light beam 25) upon optical disk 7.

Objective lens 6 constitutes a light-converging lens that focuses a light beam (e.g., infrared light beam 25 or red light beam 2) onto optical disk 7.

Optical disk 7 denotes an optical disk with a single spiral track that, if followed the entire length of the track, connects the inside of the disk to the outer edge.

Diffractive element 4 denotes an optical element in which a phase or a transmissivity having a periodical structure is used. Diffractive element 4 is used to separate the beams reflected off optical disk 7 to their respective photodetectors. In one example, diffractive element 4 is used to separate +1st-order red laser diffracted light 10 (also known as the tracking portion) from −1st-order red laser diffracted light 11 (also known as the processing portion). As a result of the diffraction in diffractive element 4, +1st-order red laser diffracted light 10 travels along the optical path until it is incident upon photodetector 81, and −1st-order red laser diffracted light 11 travels along the optical path until it is incident upon photodetector 82. In another example, diffractive element 4 is used to separate +1st-order infrared laser diffracted light 12 from −1st-order infrared laser diffracted light 13. As a result, +1st-order infrared laser diffracted light 12 travels along the optical path until it is incident upon photodetector 81, and −1st-order infrared laser diffracted light 13 travels along the optical path until it is incident upon photodetector 83. In diffractive element 4, the period or direction, that is, a grating vector, may vary depending on the parts. In one example, diffractive element 4 is a hologram. In a more specific example, diffractive element 4 is a phase-type hologram.

+1st-order red laser diffracted light 10 and −1st-order red laser diffracted light 11 represent the first diffraction order red laser light diffracted through diffractive element 4.

+1st-order infrared laser diffracted light 12 and −1st-order infrared laser diffracted light 13 represent the first diffraction order infrared laser light diffracted through diffractive element 4.

Reflective optical path 14 shows the optical path of the laser beams after they are reflected off optical disk 7. FIG. 1B clearly shows that reflective optical path 14 passes through diffractive element 4, but does not pass through grating 3.

Photodetectors 81, 82, and 83 carry out a photoelectric conversion, receiving light beams and converting the received light beams into electric signals such as electric current. In one example, photodetectors 81, 82, and 83 are on a single silicon substrate, such that the relative positional relationship of them can be determined precisely. Photodetectors 81, 82, and 83 are electronically connected to other electronics (not shown) within the optical disk device (DVD player, CD-R, etc.) where the electrical analog of the light impinging on photodetectors 81, 82, and 83 is conditioned and converted to the digital domain.

Diffractive light beams 15 consist of the different light paths that emerge from diffractive element 4, such as +1st-order red laser diffracted light 10, −1st-order red laser diffracted light 11, +1st-order infrared laser diffracted light 12, and −1st-order infrared laser diffracted light 13.

Laser beams 26 represents the beams in system 20, such as red light beam 2 and infrared light beam 25.

Photodetector array 88 is an array of photodetectors, such as photodetectors 81, 82, and 83, used to read diffractive light 15.

Lasers 90 is a set of lasers within system 20, such as red laser 1a and infrared laser 1b.

Figure 2A:
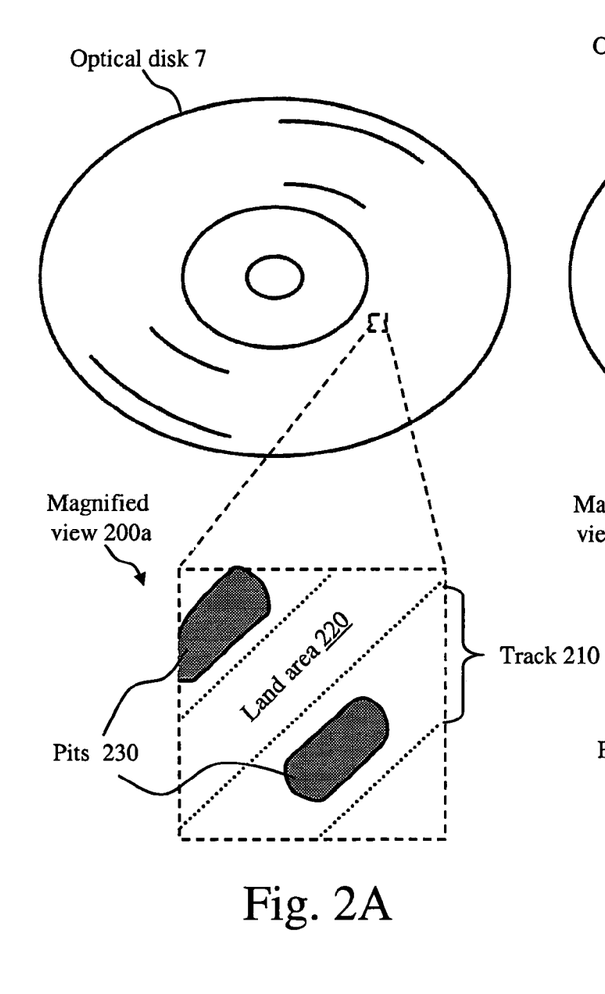
FIG. 2A is a view of an optical disk (CD)

FIG. 2A shows a magnified view 200a of an exemplary optical disk 7 that is a CD, including such elements as a track 210, a land area 220, and a plurality of pits 230.

Track 210 is a single spiral track that travels along optical disk 7 from its inner diameter to its outer edge. Within track 210 are a plurality of pits 230. Pits 230 represent the data bits stored on optical disk 7. Land area 220 is a substantially flat surface on optical disk 7 around track 210. Land area 220 contains no pits 230. In one example, land area 220 is approximately 600 nm across, track 210 is 500 nm wide, and pits 230 are 500 nm wide, 830 nm long, and 125 nm deep. In this same example, the track pitch (i.e., the distance from the center of one pit 230 to the center of a pit 230 in the adjacent ring of track 210) is 1600 nm.

In operation within optical pick-up system 20, infrared laser 1b is used to read pits 230 on optical disk 7.

Figure 2B:
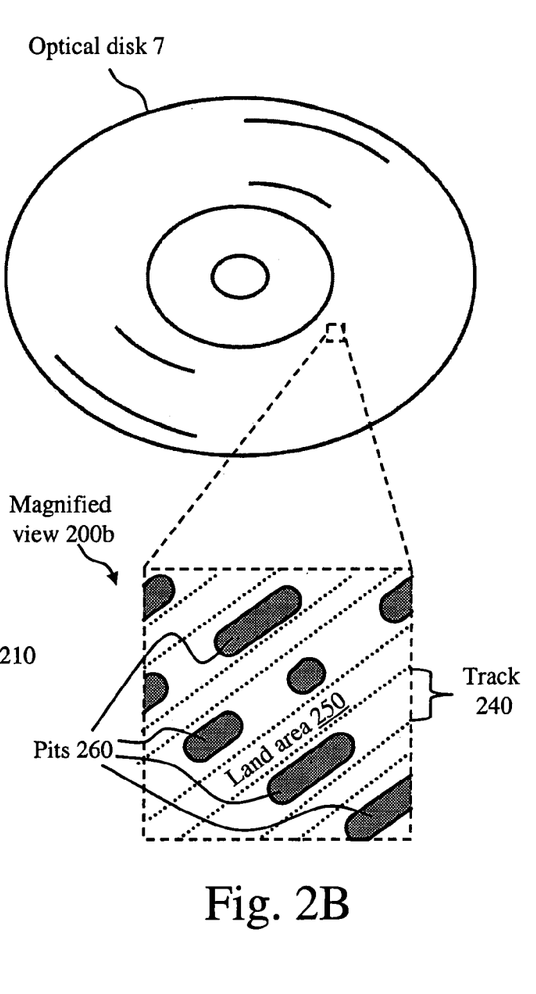
FIG. 2B is a view of an optical disk (DVD)

FIG. 2B shows a magnified view 200b of an exemplary optical disk 7 that is a DVD, including such elements as a track 240, a land area 250, and a plurality of pits 260.

Track 240, land area 250, and pits 260 provide the same function as track 210, land area 220, and pits 230, respectively. Track 240, land area 250, and pits 260 differ in that these elements are smaller than their equivalents described in reference to FIG. 2A. In one example, land area 250 is approximately 400 nm across, track 210 is 340 nm wide, and pits 260 are 320 nm wide, 400 nm long, and 120 nm deep. In this same example, the track pitch is 740 nm. DVDs contain more data than CDs, therefore requiring smaller elements, specifically, track 240, land area 250, and pits 260.

In operation within optical pick-up system 20, red laser 1a is used to read pits 260 on optical disk 7.

Figure 3:
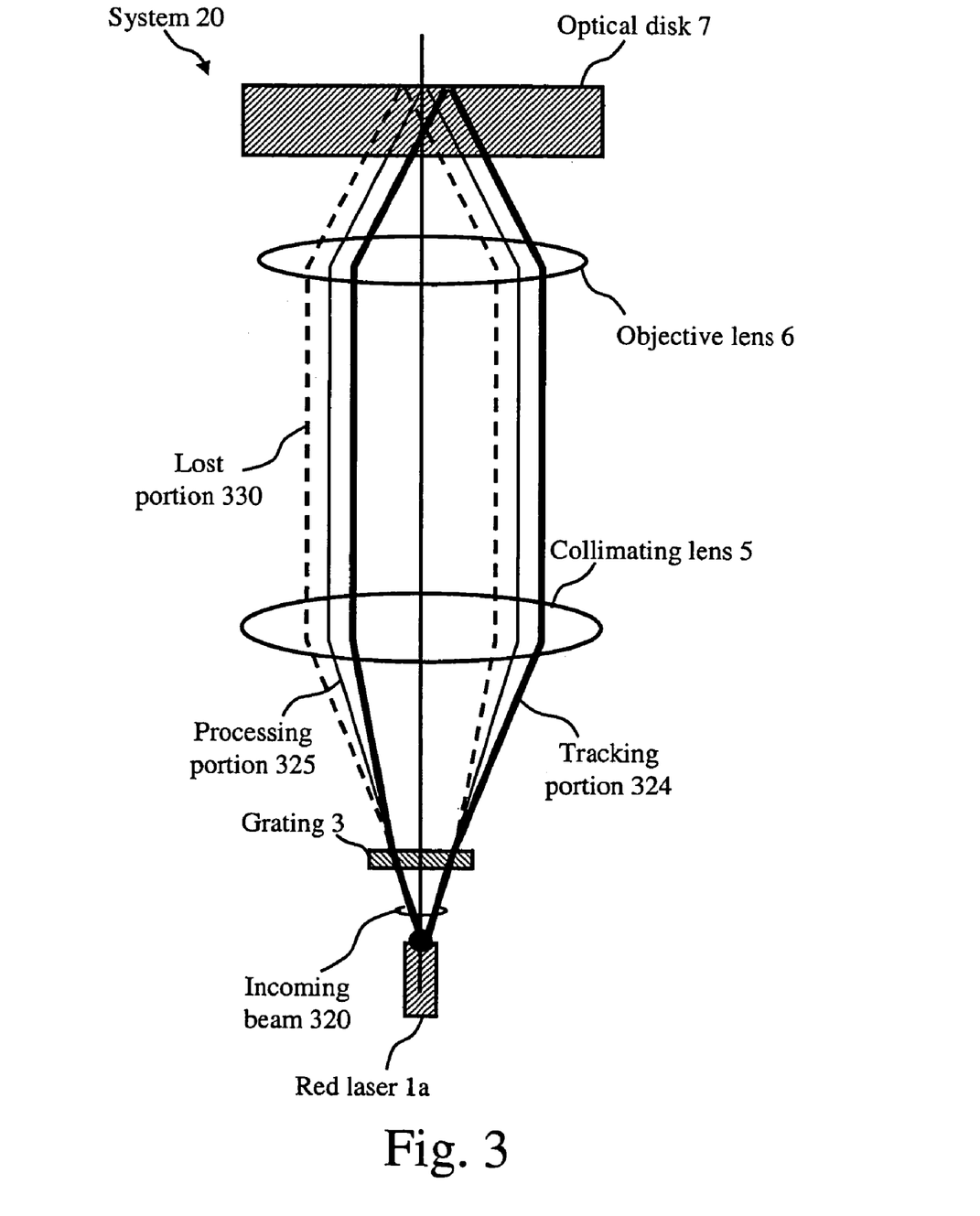
FIG. 3 is a front view of an optical pick-up system for use in optical disk devices with outgoing beam diffraction highlighted.

FIG. 3 illustrates system 20 with just the outgoing read laser beam path to optical disk 7. The beam path has been shown in greater detail, with previously defined laser beam 26 divided into an incoming beam 320, a tracking portion 324, a processing portion 325, and a lost portion 330.

FIG. 4 shows a magnified view of grating 3, incoming beam 320, tracking portion 324, processing portion 325, and lost portion 330.

Grating 3 denotes a binary grating. Within grating 3, there are two steps per period. In one example, each diffraction period measures 3.8 microns and the height of the steps is 0.3 microns. Grating 3 diffracts incoming beam 320 (e.g., red light beam 2 or infrared light beam 25) into processing portion 325, tracking portion 324, and lost portion 330, as well as performing higher order diffraction. For the sake of simplicity, it is assumed in this example that incoming beam 320 is orthogonal to diffraction grating 3; therefore, the angle of diffraction ($\theta_i$) in the following equation (Equation 1) is equal to zero.

$$\sin \theta_q = \sin \theta_i + q\lambda/\Lambda \qquad \text{Equation 1}$$

where $\lambda$=wavelength, $\Lambda$=diffraction period, and q=diffraction order.

For grating 3 to be at all effective, it is important that $\lambda<\Lambda$.

In one example, incoming beam 320 has a diameter of 110 microns. In the same example, processing portion 325 has a diameter of 110 microns, and tracking portion 324 and lost portion 330 each have a diameter of 110 microns. Additionally referring to FIG. 4, $\theta_{q=-1}$ is equal to $\theta_{q=1}$ and the intensity of each of the first-order diffraction beams (e.g., processing portion 325 and lost portion 330) are equal.

If a way can be found to lessen or eliminate lost portion 330, therefore allowing more laser energy within tracking portion 324 and processing portion 325, a more efficient and less expensive optical pick-up system could result.

In example operation for DVD reading and tracking, red light beam 2 emitted from red laser 1a passes through grating 3, and red light beam 2 is separated into tracking portion 324 and processing portion 325. Tracking portion 324 and processing portion 325 propagate along the optical path, around diffractive element 4, are focused by collimating lens 5 into a nearly parallel light beam, and are converged onto optical disk 7 by objective lens 6. Furthermore, tracking portion 324 and processing portion 325 are diffracted and reflected by pits 260 or the grooves of tracks 240, respectively, on the surface of optical disk 7. Thereafter, tracking portion 324 and processing portion 325 return on a reflective optical path by way of objective lens 6 and collimating lens 5, and enter diffractive element 4, which generates +1st-order red laser diffracted light 10 and −1st-order red laser diffracted light 11.

+1st-order red laser diffracted light 10 and −1st-order red laser diffracted light 11 enter photodetector 81 and photodetector 82, respectively, and are photoelectrically converted. The position of +1st-order red laser diffracted light 10 upon photodetector 81 indicates whether processing portion 325 of red light beam 2 was incident upon a bump in track 240 of optical disk 7. Additionally, the position of −1st order red laser diffracted light 11 upon photodetector 82 indicates whether tracking portion 324 of red light beam 2 was incident upon land area 250 between tracks 240 of optical disk 7.

The present invention is an optical pick-up system for use in an optical disk device including a more efficient beam diffraction grating for tracking purposes.

Figure 5:
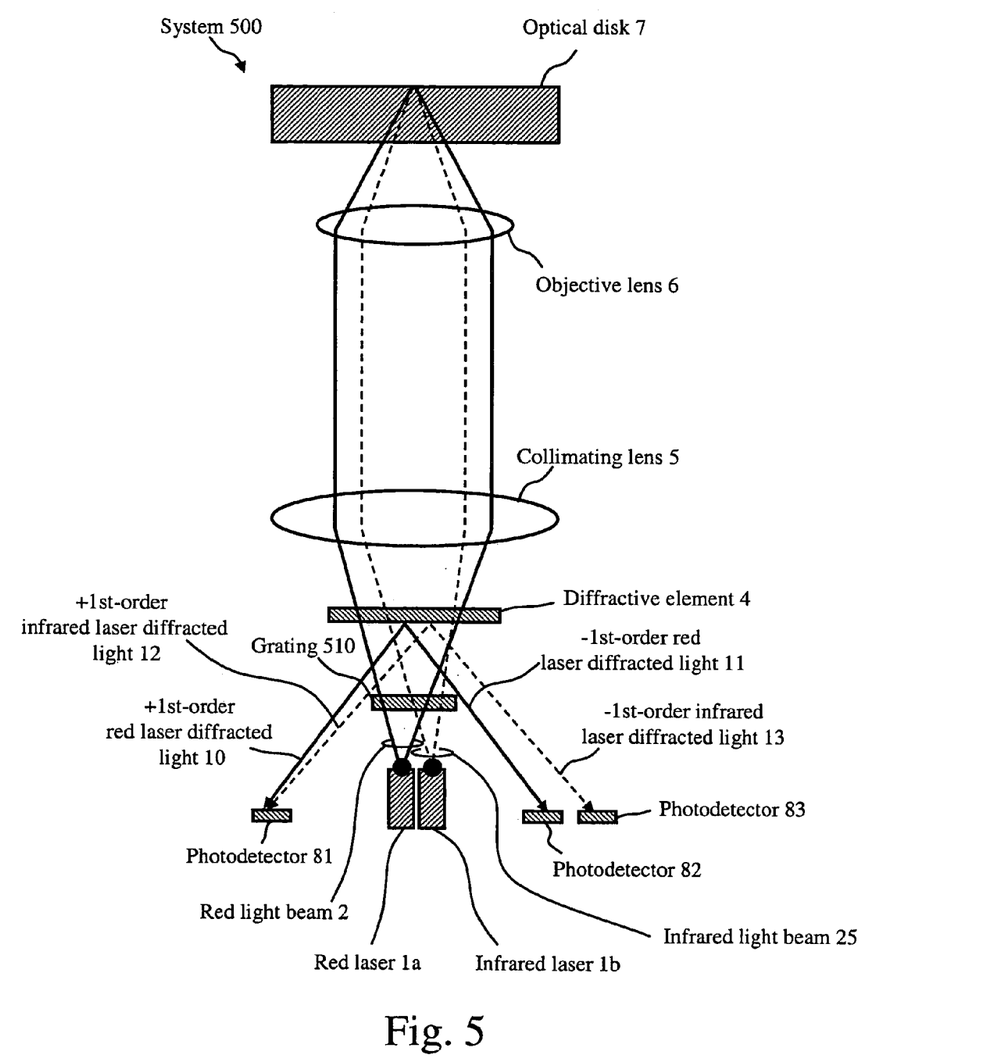
FIG. 5 is a view of the optical pick-up system for use in optical disk devices of the present invention.

FIG. 5 shows a system 500, including the elements of: red laser 1a, infrared laser 1b, red light beam 2, a grating 510, diffractive element 4, collimating lens 5, objective lens 6, optical disk 7, +1st-order red laser diffracted light 10, −1st-order red laser diffracted light 11, +1st-order infrared laser diffracted light 12, −1st-order infrared laser diffracted light 13, infrared light beam 25, photodetector 81, photodetector 82, and photodetector 83. All elements, with the exception of grating 510, are as described in reference to FIG. 1A. Grating 510 is described in further detail in reference to FIG. 6.

Figure 6:
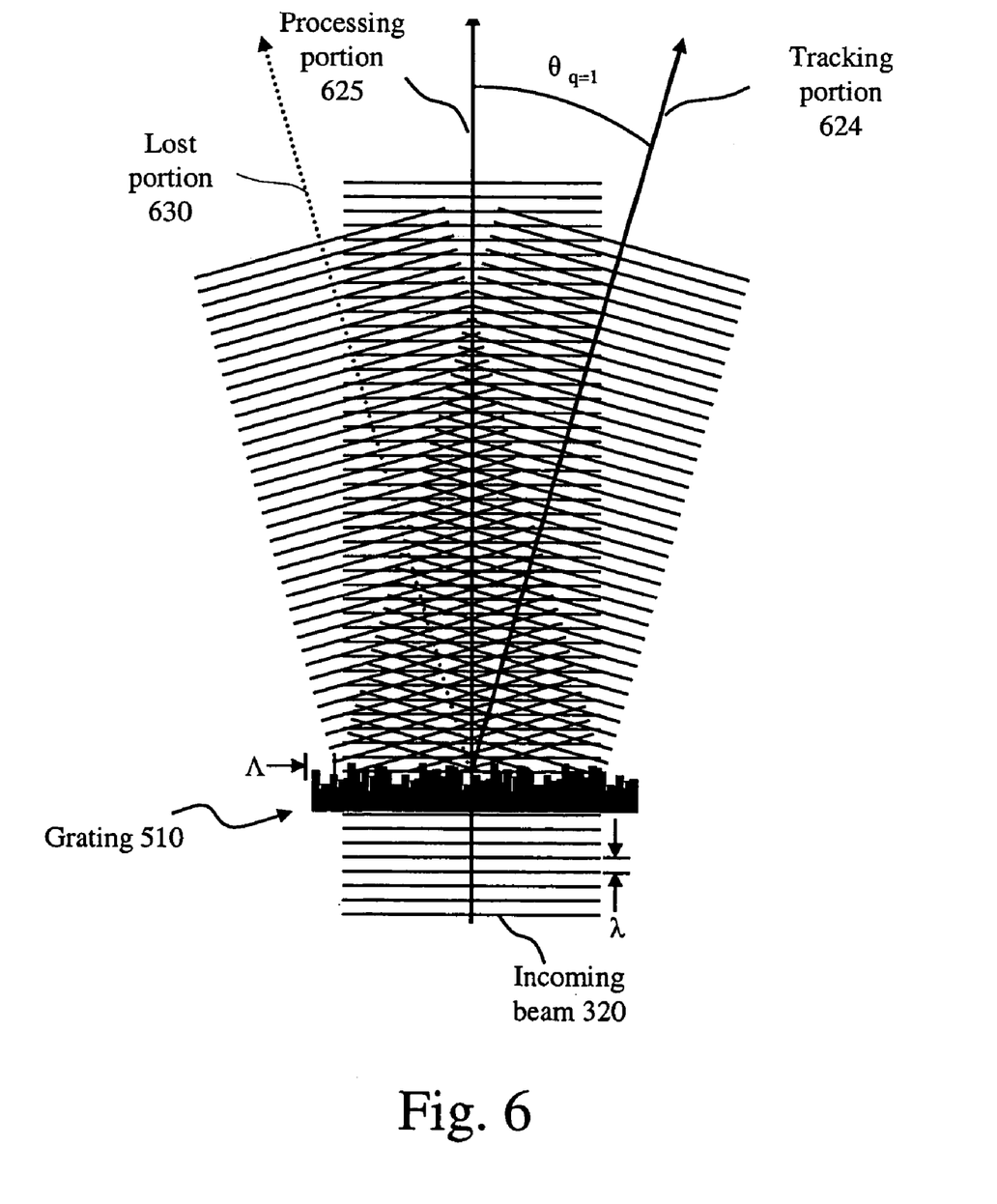
FIG. 6 is a magnified view of a grating used in the first embodiment of the invention.

FIG. 6 shows a magnified view of grating 510. FIG. 6 additionally shows incoming beam 320, a tracking portion 624, a processing portion 625, and a lost portion 630.

Figure 7:
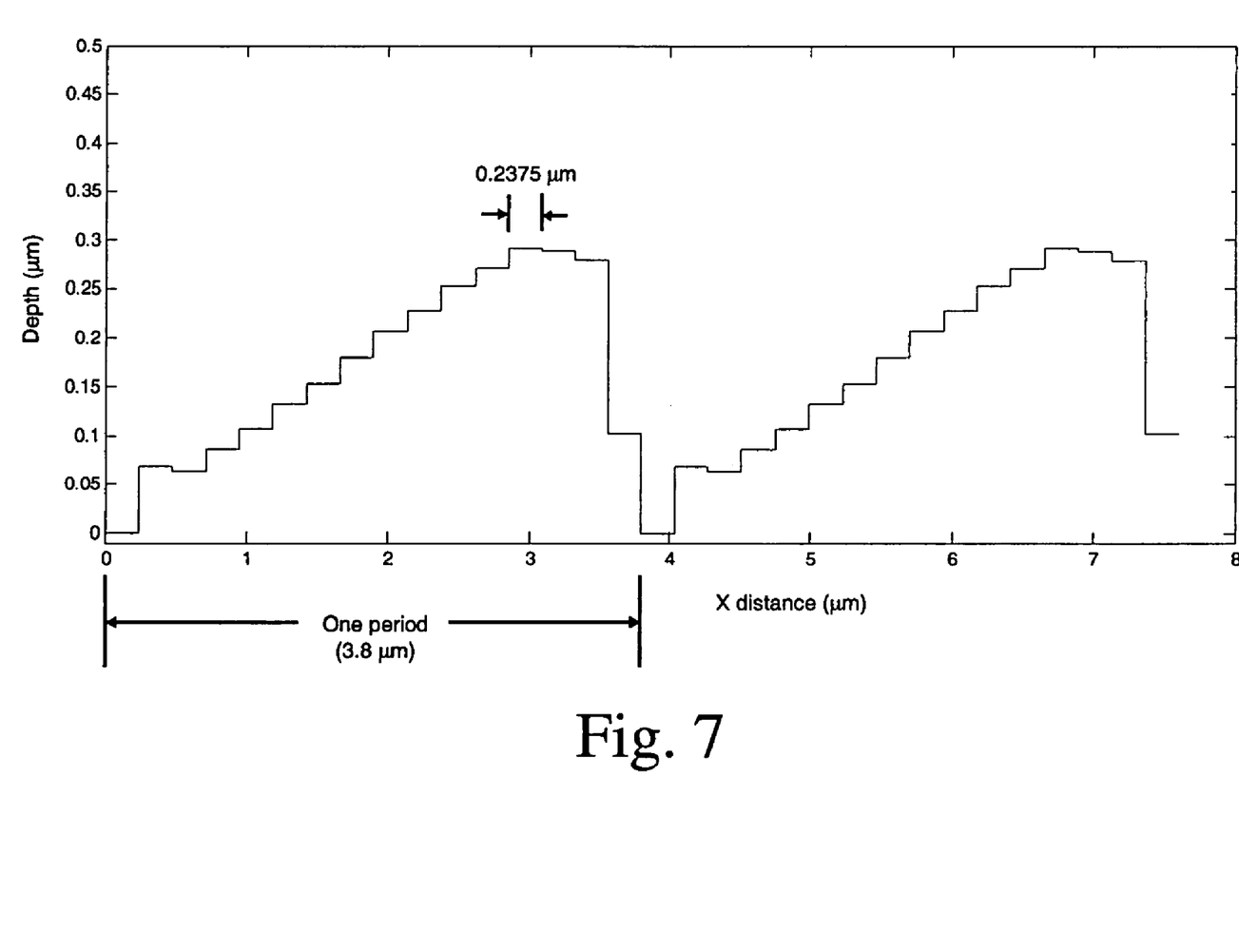
FIG. 7 is a view of exemplary design data for two periods of a grating design, wherein the design is for a wavelength of 658 nm, a glass substrate having an index of refraction n=1.52 at 658 nm, and there are 16 pixels in each period.

Grating 510 is the distinguishing element between system 20 and system 500. Grating 510 is a gray scale grating. In one example, grating 510 has sixteen pixels within each diffraction period, as shown in FIG. 7, wherein each pixel has a different phase between 0 and $2\pi$. Grating 510 efficiently diffracts incoming beam 320, creating tracking portion 624, processing portion 625 and reduced lost portion 630. This represents a substantial improvement over previous inventions (i.e., grating 3 in system 20), in which a significant portion of incoming beam 320 was lost.

In one example, gray scale grating design is shown in FIG. 7, and the corresponding design data is shown in Table 1. This grating is designed to be made as a transmission grating in glass with an index of refraction of 1.52 at a laser wavelength of 658 nm. The grating has a period of 3.8 μm. There are 16 pixels in one period, therefore each pixel has a width of 0.2375 μm. Each pixel has a height indicated in Table 1, giving a certain phase retardation to the incident beam to that pixel. The guidelines for the design is that the +1$^{st}$-order (e.g. tracking portion 624) should have 9.4% of the incident beam power, and percent of the incident beam power should be maximized to remain in the un-diffracted zero-order (e.g. processing portion 625) to the greatest extent possible. For the design shown in FIG. 7 and Table 1, the diffracted +1$^{st}$-order (e.g. tracking portion 624) has 9.4% of the incident beam power, which is the desired percentage of the incident beam power. The zero-order beam (e.g. processing portion 625) has 81.5% of the incident beam power, and the −1$^{st}$-order (e.g. lost portion 630) has 4.8% of the incident beam power.

Compared with the case of a binary grating (e.g. grating 3), where the zero-order (e.g. processing portion 325) has 75% of the incident beam power, and −1$^{st}$-order (e.g. lost portion 330) has 9% of the beam power, we can see that the gray scale grating design has increased the performance and reduced wasted beam power that previously was directed into unwanted diffraction orders.

TABLE 1

Design data for example grating as illustrated in FIG. 7.
Grating Design

| X (um) | Depth (um) |
| --- | --- |
| 0 to 0.2375 | 0.000 |
| 0.2375 to 0.4750 | 0.069 |
| 0.4750 to 0.7125 | 0.064 |
| 0.7125 to 0.9500 | 0.087 |
| 0.9500 to 1.1875 | 0.106 |
| 1.1875 to 1.4250 | 0.132 |

TABLE 1-continued

Design data for example grating as illustrated in FIG. 7.
Grating Design

| X (um) | Depth (um) |
|---|---|
| 1.4250 to 1.6625 | 0.154 |
| 1.6625 to 1.9000 | 0.180 |
| 1.9000 to 2.1375 | 0.207 |
| 2.1375 to 2.3750 | 0.228 |
| 2.3750 to 2.6125 | 0.253 |
| 2.6125 to 2.8500 | 0.271 |
| 2.8500 to 3.0875 | 0.291 |
| 3.0875 to 3.3250 | 0.289 |
| 3.3250 to 3.5625 | 0.278 |
| 3.5625 to 3.8000 | 0.102 |

As the pixel size is only 0.2375 μm, high resolution, high accuracy fabrication methods are required to manufacture the grating. A typical mass manufacturing method is press-molding, wherein a mold with the complimentary (negative) profile is used to press the profile into the grating under pressure and elevated temperature.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An optical pick-up system for use in an optical disk device, the system comprising:
   a gray-scale grating receiving an incident beam and producing a tracking portion and a processing portion, wherein said grating has at least three pixels in one period, each pixel having a different phase between 0 and $2\pi$.

2. The system of claim 1, wherein said grating has exactly sixteen pixels in one period.

3. The system of claim 1, wherein said grating is made as a transmission grating in glass with an index of refraction of 1.52 at a laser wavelength of 658 nm.

4. The system of claim 3, wherein the grating has a period of 3.8 μm and there are 16 pixels in one period, such that each pixel has a width of 0.2375 μm.

5. The system of claim 4, wherein each pixel has a height according to the following table:

Grating Design

| X (um) | Depth (um) |
|---|---|
| 0 to 0.2375 | 0.000 |
| 0.2375 to 0.4750 | 0.069 |
| 0.4750 to 0.7125 | 0.064 |
| 0.7125 to 0.9500 | 0.087 |
| 0.9500 to 1.1875 | 0.106 |
| 1.1875 to 1.4250 | 0.132 |
| 1.4250 to 1.6625 | 0.154 |
| 1.6625 to 1.9000 | 0.180 |
| 1.9000 to 2.1375 | 0.207 |
| 2.1375 to 2.3750 | 0.228 |
| 2.3750 to 2.6125 | 0.253 |
| 2.6125 to 2.8500 | 0.271 |
| 2.8500 to 3.0875 | 0.291 |
| 3.0875 to 3.3250 | 0.289 |
| 3.3250 to 3.5625 | 0.278 |
| 3.5625 to 3.8000 | 0.102, | such that a certain phase retardation is given to the incident beam to that pixel.

6. The system of claim 1, wherein the tracking portion has more than 9% of incident beam power.

7. The system of claim 6, wherein the tracking portion has at least 9.4% of incident beam power.

8. The system of claim 7, wherein the processing portion has at least 81.5% of incident beam power.

9. The system of claim 8, wherein the tracking portion has more than 9% of incident beam power.

10. The system of claim 9, wherein the tracking portion has at least 9.4% of incident beam power.

11. The system of claim 10, wherein a lost portion also produced by said grating has no more than 4.8% of the incident beam power.

12. The system of claim 1, wherein the processing portion has more than 75% of incident beam power.

13. The system of claim 1, wherein a lost portion also produced by said grating has less than 9% of the incident beam power.

14. The system of claim 1, wherein pixel size is 0.2375 μm.

15. The system of claim 1, wherein said grating is mass manufactured by press-molding, wherein a mold with a complimentary (negative) profile is used to press a profile into said grating under pressure and elevated temperature.

16. The system of claim 1, further comprising a red laser emitting the incident beam as a red light beam which passes through said grating, such that the red light beam is separated into the tracking portion and the processing portion.

17. The system of claim 16, further comprising a diffractive element disposed in an optical path along which the tracking portion and processing portion propagate around said diffractive element.

18. The system of claim 17, further comprising a collimating lens focusing the tracking portion and processing portion into a nearly parallel light beam.

19. The system of claim 18, further comprising an objective lens converging the tracking portion and processing portion onto an optical disk having tracks with pits and grooves that diffract and reflect the tracking portion and processing portion.

20. The system of claim 19, wherein said objective lens, said collimating lens return tracking portion and processing portion on a reflective optical path to said diffractive element, which generates +1st-order red laser diffracted light and −1st-order red laser diffracted light 11.

21. The system of claim 20, further comprising:
   a first photodetector receiving and photoelectrically converting the +1st-order red laser diffracted light; and
   a second photodetector receiving and photoelectrically the −1st-order red laser diffracted light.

22. The system of claim 21, wherein position of +1st-order red laser diffracted light upon the first photodetector indicates whether the processing portion of the red light beam was incident upon a bump in a track of the optical disk, and position of −1st order red laser diffracted light upon the second photodetector indicates whether the tracking portion of the red light beam was incident upon land area between tracks of the optical disk.

23. The grating of claim 1, wherein said grating is mass manufactured by press-molding, wherein a mold with a complimentary (negative) profile is used to press the profile into said grating under pressure and elevated temperature.

24. A gray-scale grating for use in an optical pickup system, comprising:
a grating profile adapted to receive an incident beam and produce a tracking portion and a processing portion, wherein said grating has at least three pixels in one period, each pixel having a different phase between 0 and $2\pi$.

25. The grating of claim 24, wherein said grating has exactly sixteen pixels in one period.

26. The grating of claim 24, wherein said grating is made as a transmission grating in glass with an index of refraction of 1.52 at a laser wavelength of 658 nm.

27. The grating of claim 26, wherein the grating has a period of 3.8 μm and there are 16 pixels in one period, such that each pixel has a width of 0.2375 μm.

28. The grating of claim 27, wherein each pixel has a height according to the following table:

| Grating Design | |
|---|---|
| X (um) | Depth (um) |
| 0 to 0.2375 | 0.000 |
| 0.2375 to 0.4750 | 0.069 |
| 0.4750 to 0.7125 | 0.064 |
| 0.7125 to 0.9500 | 0.087 |
| 0.9500 to 1.1875 | 0.106 |
| 1.1875 to 1.4250 | 0.132 |
| 1.4250 to 1.6625 | 0.154 |
| 1.6625 to 1.9000 | 0.180 |
| 1.9000 to 2.1375 | 0.207 |
| 2.1375 to 2.3750 | 0.228 |

-continued

| Grating Design | |
|---|---|
| X (um) | Depth (um) |
| 2.3750 to 2.6125 | 0.253 |
| 2.6125 to 2.8500 | 0.271 |
| 2.8500 to 3.0875 | 0.291 |
| 3.0875 to 3.3250 | 0.289 |
| 3.3250 to 3.5625 | 0.278 |
| 3.5625 to 3.8000 | 0.102, | such that a certain phase retardation is given to the incident beam to that pixel.

29. The grating of claim 24, wherein the tracking portion has more than 9% of incident beam power.

30. The grating of claim 29, wherein the tracking portion has at least 9.4% of incident beam power.

31. The grating of claim 24, wherein the processing portion has more than 75% of incident beam power.

32. The grating of claim 31, wherein the processing portion has at least 81.5% of incident beam power.

33. The grating of claim 32, wherein the tracking portion has more than 9% of incident beam power.

34. The grating of claim 33, wherein the tracking portion has at least 9.4% of incident beam power.

35. The grating of claim 34, wherein a lost portion also produced by said grating has no more than 4.8% of the incident beam power.

36. The grating of claim 24, wherein a lost portion also produced by said grating has less than 9% of the incident beam power.

37. The grating of claim 24, wherein pixel size is 0.2375 μm.

* * * * *